United States Patent [19]

Imazeki et al.

[11] 4,415,965
[45] Nov. 15, 1983

[54] PROGRAMMABLE SEQUENCE CONTROLLER

[75] Inventors: Ryoji Imazeki, Hachioji; Katsuaki Kusumi, Kawasaki; Yoshihiro Nakajima, Hino, all of Japan

[73] Assignee: Fujitsu Fanuc Limited, Tokyo, Japan

[21] Appl. No.: 224,025

[22] Filed: Jan. 12, 1981

[30] Foreign Application Priority Data

Feb. 1, 1980 [JP] Japan .................. 55-11108

[51] Int. Cl.³ ................. G06F 15/46; G05B 19/18
[52] U.S. Cl. ................... 364/136; 364/141; 364/147; 364/167; 364/474; 364/900
[58] Field of Search ............. 364/136, 140, 141, 146, 364/147, 167–171, 474, 475, 200 MS File, 900 MS File

[56] References Cited

U.S. PATENT DOCUMENTS

| | | | |
|---|---|---|---|
| 4,034,354 | 7/1977 | Simmons | 364/900 |
| 4,038,533 | 7/1977 | Dummermuth et al. | 364/136 X |
| 4,064,395 | 12/1977 | Schubeler et al. | 364/136 |
| 4,068,297 | 1/1978 | Komiya | 364/136 |
| 4,149,235 | 4/1979 | Froyd et al. | 364/136 X |
| 4,199,814 | 4/1980 | Rapp et al. | 364/900 X |
| 4,209,847 | 1/1980 | Noda et al. | 364/900 |
| 4,212,081 | 7/1980 | Suzuki et al. | 364/900 |

OTHER PUBLICATIONS

Jeffery–"Retrofitting with CNC"–Proc. of Annual Meeting and Tech. Conf. of Numerical Control Society, Proc. 15, Chicago, Ill., Apr. 1978, pp. 194-206.
Hoffmann et al–"Sinumerik Sprint 8T, a Manually Programmable Numerical Control for Lathes," Siemens Power Engineering, vol. 1, Nov. 1981, No. 11, pp. 343-347.

Primary Examiner—Joseph F. Ruggiero
Attorney, Agent, or Firm—Staas & Halsey

[57] ABSTRACT

A programmable sequence controller which enables display of the contents of a storage means for storing input and output data to and from a machine, and which permits numerical values to be set in the storage device from an external unit. The programmable sequence controller utilizes a sending and receiving unit for an exchange of commands and other data with a numerical control device in order to transfer display content and numerical values which have been set. This allows the contents to be displayed on display means provided in the numerical control device, and permits the setting of numerical values which are entered from a data setting means provided in the numerical control device.

4 Claims, 7 Drawing Figures

| Symbol | Address & Bit in Data memory 3 | Symbol | Address & Bit in Data memory 3 |
|---|---|---|---|
| ⋮ | ⋮ | ⋮ | ⋮ |
| AUT | 10.1 | MF | 66.1 |
| M03 | 10.2 | M28 | 67.8 |
| SPCCW | 10.3 | M24 | 67.7 |
| SPCW | 20.5 | M22 | 67.6 |
|  |  | M21 | 67.5 |
|  |  | M18 | 67.4 |
| HS.M | 11.1 | M14 | 67.3 |
| J.M | 11.2 | M12 | 67.2 |
| MAN | 11.3 | M11 | 67.1 |
| READY | 20.1 |  |  |
| CRH | 20.2 |  |  |
| CRA | 42.2 |  |  |
| ⋮ | ⋮ | ⋮ | ⋮ |

Fig. 5

| Command Code | Operand |
|---|---|
| ⋮ | ⋮ |
| RD | MF |
| AND·NOT | M28 |
| AND·NOT | M24 |
| AND·NOT | M22 |
| AND·NOT | M21 |
| AND·NOT | M18 |
| AND·NOT | M14 |
| AND | M12 |
| AND | M11 |
| WRT | M03 |
| ⋮ | ⋮ |
| RD | AUT |
| AND | M03 |
| AND·NOT | SPCCW |
| WRT | SPCCW |
| ⋮ | ⋮ |
| RD | HS.M |
| OR | J.M |
| OR | MAN |
| AND | READY |
| AND·NOT | CRH |
| WRT | CRA |
| ⋮ | ⋮ |

Rows 1–11 are bracketed as ①. Rows 13–16 are bracketed as ②.

PROGRAMMABLE SEQUENCE CONTROLLER

CROSS REFERENCES TO RELATED TO APPLICATIONS

This application is related to our copending U.S. Application Ser. No. 225,697, filed Jan. 16, 1981, entitled "Programmable Sequence Controller".

BACKGROUND OF THE INVENTION

This invention relates to a programmable sequence controller which is installed between a numerical control device and a machine such as a machine tool or robot. More particularly, the invention relates to a programmable sequence controller which permits a display of the data stored in a temporary storage circuit adapted to store the data which is exchanged with the machine through a data input/output unit, and which permits predetermined numerical values to be set in the temporary storage circuit from an external unit.

Numerical control systems permit various mechanical elements in machine tools, robots and other devices to be controlled on the basis of instructions from a numerical control device which incorporates an operation panel. It is necessary in such numerical control systems to provide circuitry between the numerical control device (referred to as an NC hereinafter) and the machine in order to transmit the NC commands to each of the mechanical elements. This is conventionally accomplished by the provision of heavy current circuitry comprising a multiplicity of relay groups, the relays being actuated in accordance with the NC commands such as M-function instructions, S-function instructions and commands from the operation panel. The conventional arrangement, however, incorporates a numerical control system which is large in size, and necessitates a large number of relays in order to handle more complicated operations. Higher costs and a decline in reliability are the result.

A proposed system for improving upon the foregoing arrangement employs a programmable sequence controller to perform the function of the relays. With a programmable sequence controller the processing of signals between the NC and machine is accomplished by way of the program, so that the problems of system size and operation complexity can be solved without a major increase in cost. Such an arrangement allows the operational status to be simply ascertained by providing a display of the data exchanged with the machine, and also permits data to be readily introduced from an external unit. Nevertheless, an increase in the cost and size of the system cannot be avoided with the conventional programmable sequence controller owing to the addition of the peripheral equipment such as the display devices and data setting devices provided exclusively for the controller.

SUMMARY OF THE INVENTION

Accordingly, an object of the present invention is to provide a programmable sequence controller which is compact and low in cost.

To this end, the display device and manual data input means of the numerical control device are employed also for the display of the data exchanged with the machine and for entering the externally applied data, thereby eliminating the need for separate display and data setting devices on the programmable sequence controller.

Other features and advantages of the invention will be apparent from the following description taken in conjunction with the accompanying drawings.

BRIEF DESCRIPTION OF THE DRAWINGS

FIG. 5 is an example of a sequence program in which the sequence functions of the controller in FIG. 3 are programmed utilizing operation codes and operands;

DESCRIPTION OF THE PREFERRED EMBODIMENT

Figure 1:
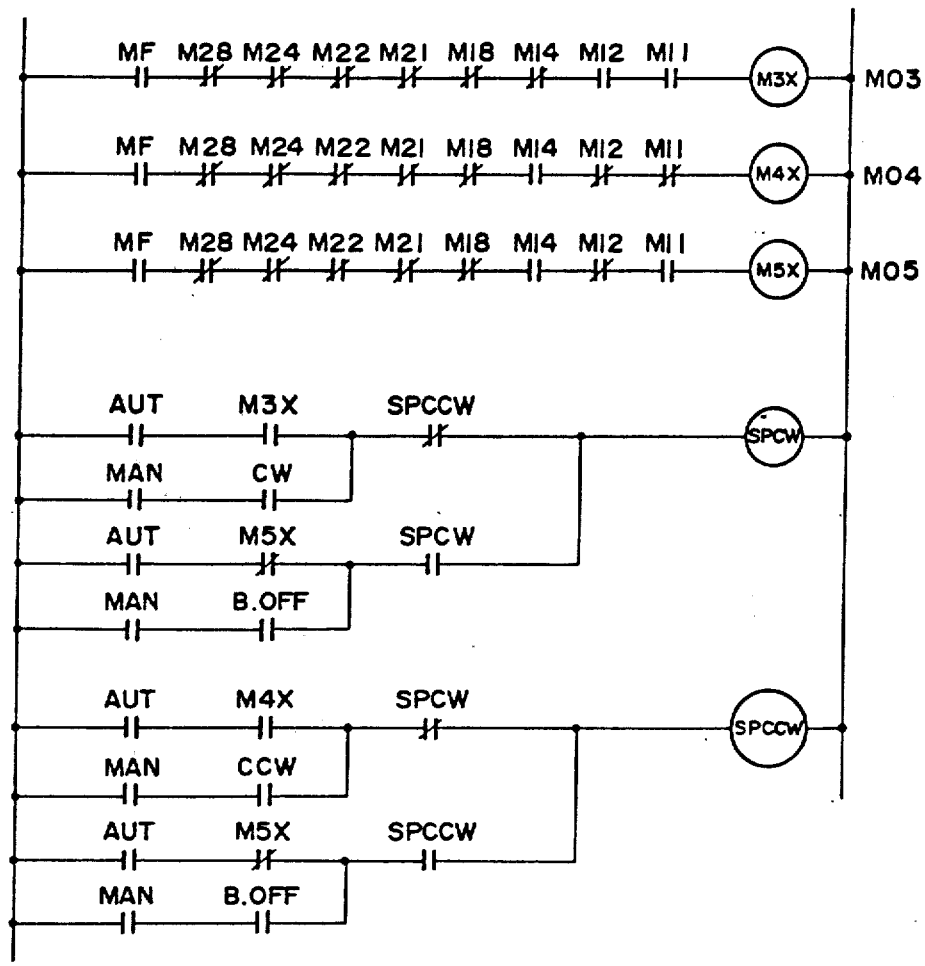
FIG. 1 is a ladder diagram which is useful in describing forward rotation, reverse rotation and stopping operations of a spindle representing one example of a mechanical element whose operation is controlled by commands from a numerical control device.

FIG. 1 shows a ladder diagram consisting of relay contacts which are in the normally open or normally closed state, the contacts belonging to relays which have the illustrated reference characters, but which are not shown. Relay contacts in the normally closed state are accompanied by a slash mark, whereas relay contacts in the normally open state have no slash. A relay MF is actuated when an M-function (miscellaneous function) instruction is read from an NC type or the like. M11 through M28 denote relays for M-code signals, of which the relays M11, M12, for example, along with the relay MF, are actuated in response to an M03 command from the NC. M3X is a relay actuated by a forward spindle rotation command M03 or the like, and M4X a relay actuated by a reverse spindle rotation command M04 or the like. M5X is a relay actuated by a spindle stop command M05 or the like. Relays AUT and MAN are actuated when an operation panel enters automatic mode and manual mode commands, respectively. SPCW and SPCCW denote relays which deliver forward spindle rotation and reverse spindle rotation outputs to the machine side, respectively.

As one example, assume that the NC issues the forward rotation command M03 in the automatic mode (relay AUT actuated). In response thereto, relays MF, M11 and M12 are actuated (but not relays M14, M18, . . . , M28), and relay M3X is actuated. As a result, relay SPCW will be actuated if the spindle is not rotating in the reverse direction (relay SPCCW deactuated), and the forward spindle rotation command will be delivered to the machine side. Now, if a manual/automatic changeover switch on the operation panel is switched over to the manual side to establish the manual mode (relay MAN actuated), and if a forward/reverse/stop changeover switch on the operation panel is switched over to the forward position (relay CW actuated), then relay SPCW will be actuated and the forward spindle rotation command will be delivered to the machine side.

Figure 2:
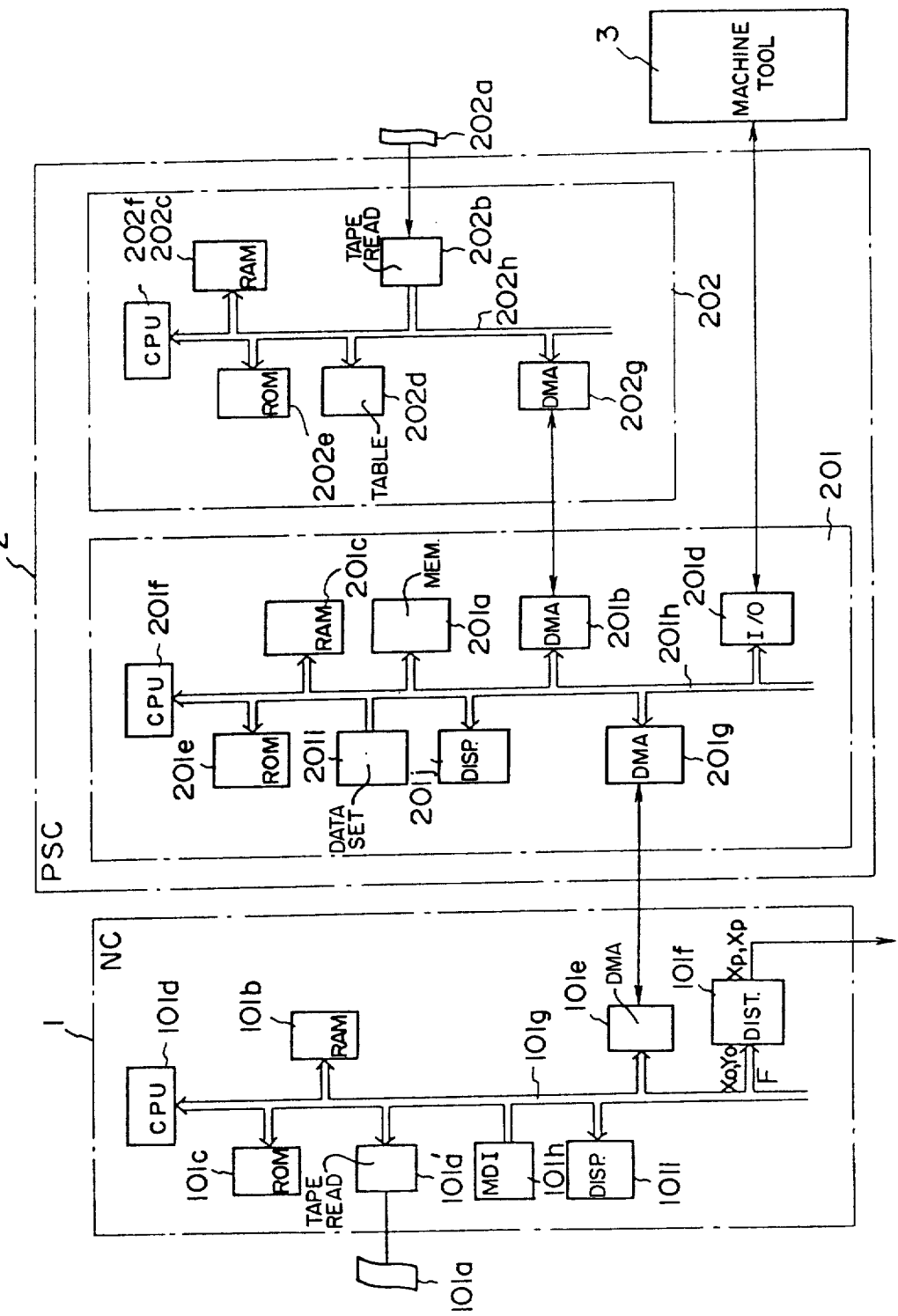
FIG. 2 is a block diagram of a previously proposed programmable sequence controller.
Figure 3:
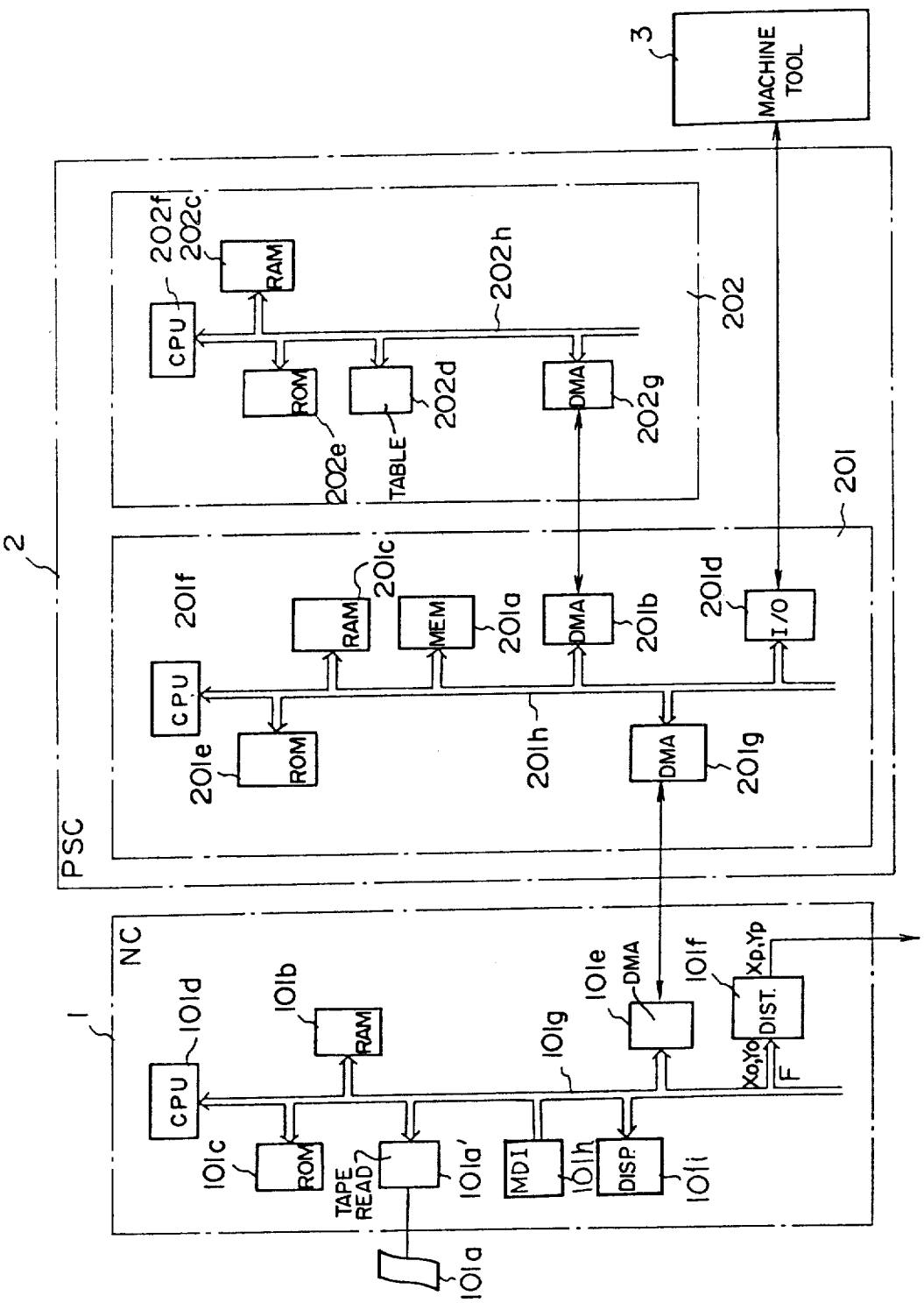
FIG. 3 is a block diagram of a programmable sequence controller in accordance with the present invention.

A programmable sequence controller (referred to as a PSC hereinafter) 2 illustrated in FIGS. 2 and 3 is programmed to perform the functions described above. The PSC 2 is installed between an NC 1 and a machine tool 3, and includes a sequence controller 201 and a programmer 202 which is adapted to convert an input sequence program into machine language and to revise a sequence program. The NC 1 includes a paper tape reader 101$a'$ for reading machining instructions which have been punched into a paper tape 101$a$. These instructions read from the tape are stored in a random access memory (RAM) 101$b$. A read-only memory ROM is provided in the NC to store the control program which controls the NC. A central processing unit (CPU) 101$d$ performs processes in accordance with instructions from the program of machining instructions or from the control program. A sending and receiving unit 101$e$, such as a direct memory access controller, is provided in the NC 1 for the purpose of exchanging data with the sequence controller 201. A pulse distributing arithmetic circuit 101$f$ receives signals indicative of amounts of movement $X_o$, $Y_o$ in the direction of X- and Y-axes and a signal indicative of a feed rate F, and executes a well-known pulse distributing operation to deliver distribution pulses $X_p$, $Y_p$. A manual data input unit (MDI) 101$h$ is mounted on the operation panel of the NC 1 and is employed to enter single blocks of machining instruction data to supplement or revise machining instruction data or the like. The NC 1 also includes a universal display device 101$i$ for displaying such information as the current position of a tool or the like. Signals travel to or from these units in the NC 1 along a bus line 101$g$.

The programmer 202 in the PSC 2 includes a paper tape reader 202$b$ for reading a sequence program which has been punched in a paper tape 202$a$. Also provided is a random access memory (RAM) 202$c$ for storing the sequence program. A table 202$d$ stores the corresponding relationship between symbols MF, AUT, . . . which are the operands of the sequence program, and storage locations in a data memory 201$a$, which is provided in the sequence controller 201. A read-only memory (ROM) 202$e$ is provided to store a control program which controls the entire programmer 202, and a language translator program for translating the sequence program, entered from a paper tape, into machine language. A central processing unit (CPU) 202$f$ executes sequence program translation and revision processes and the like in accordance with the program stored in the ROM 202$e$. A sending and receiving unit 202$g$ including a buffer or the like executes an exchange of data with the sequence controller 201. Signals travel to or from these units in the programmer 202 along a bus line 202$h$. It should be noted that the programmer 202 in FIG. 3 does not include the paper tape reader 202$b$. The reason, which will be described in further detail below, resides in that the programmer 202 utilizes the paper tape reader 101$a'$ provided in the NC 1.

Figures 4, 6:
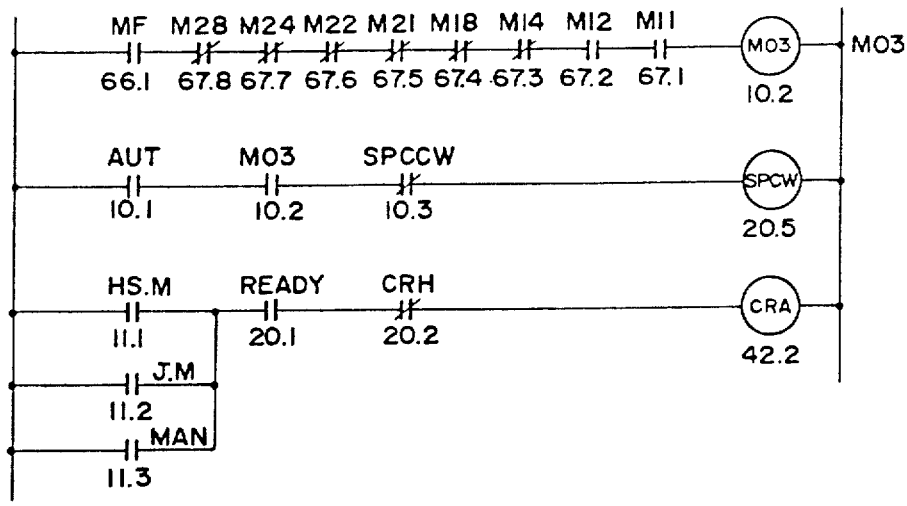
FIG. 4 is an example of a ladder diagram of a sequence circuit.
FIG. 6 is an example of a table for storing the corresponding relationship between symbols, employed as operands, and locations in the data memory.

The sequence controller 201 in the PSC 2 includes a data memory 201$a$ for establishing correspondence between each of the relays in FIG. 1 or in FIG. 4 and a single bit, and for storing the actuated/deactuated states of the relays in the form of "1"/"0" representation, respectively. For example, when the automatic mode is instructed by the operation panel, the relay AUT is actuated in the case of the heavy current circuitry, whereas a "1" is stored in the first bit at the address 10 in the data memory 201$a$ in the case of the sequence controller. A sending and receiving unit 201$b$, including a buffer or the like, supervises the exchange of data with the programmer 202. Further provided in the sequence controller 201 is a RAM 201$c$ for storing the sequence program which has been translated into machine language by the programmer 202. A data input/output unit 201$d$ is provided to supervise the input and output of data between the sequence controller 201 and the machine tool 3. A ROM 201$e$ stores the control program which controls the sequence controller 201. A central processing unit 201$f$ performs predetermined sequence processes in accordance with the control program and a sequence program. A direct memory access controller (DMA) 201$g$ is provided in the sequence controller 201 for the purpose of exchanging data with the NC 1. Further provided in the previously proposed arrangement of FIG. 2 is a data setting device 201$i$ which presets predetermined numerical values in counters and registers provided in the data input/output unit 201$d$, as well as a display device 201$j$ which displays the contents of the flip-flops, counters and registers and the like located in the data input/output device 201$d$. Signals travel to or from these units in the sequence controller 201 along a bus line 201$h$.

Figure 7:
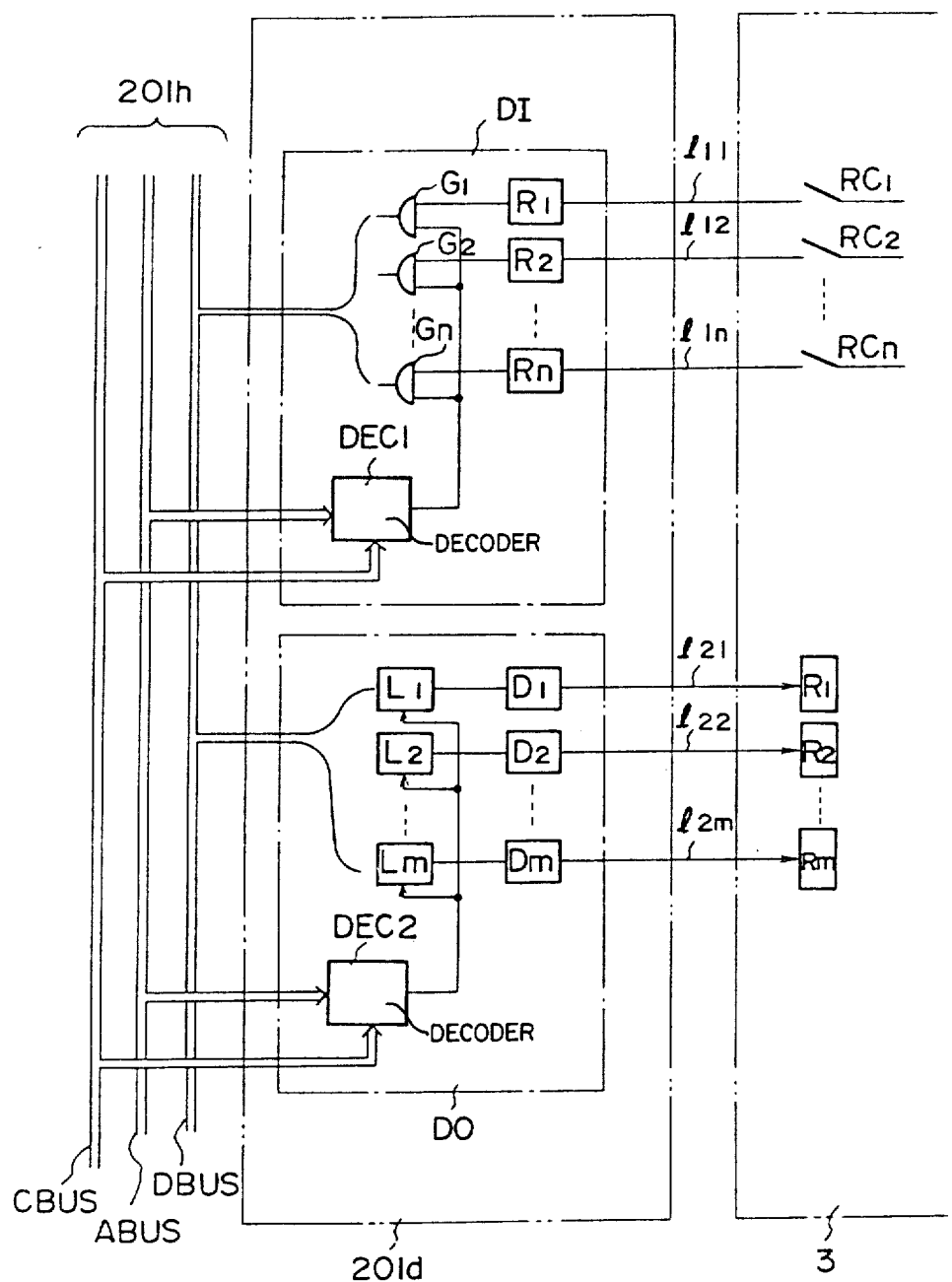
FIG. 7 is a block diagram of the data input/output unit shown in FIGS. 2 and 3.

A block diagram of the data input/output unit 201$d$ is shown in FIG. 7. The data input/output unit 201$d$ comprises a data input circuit DI and a data output circuit DO. The data input circuit DI includes receivers $R_1$ through $R_n$ which receives signals from various limit switches and relay contacts $RC_1$ through $RC_n$ on the machine side, AND gates $G_1$ through $G_n$, and a decoder $DEC_1$ which decodes address signals traveling along an address bus ABUS to open predetermined ones of the AND gates so that the AND gate output is sent out on the data bus DBUS. The data output circuit DO includes flip-flops (or latch circuits if desired) $L_1$ through $L_m$ for storing such signals as forward and reverse spindle rotation signals obtained from the machine 3; drivers $D_1$ through $D_m$ provided for respective ones of the flip-flops $L_1$ through $L_m$ for delivering the output signals from the flip-flops (flip-flop will be abbreviated to FF hereinafter) to the machine 3, and for actuating relays $R_1$ through $R_m$ on the machine side; and a decoder $DEC_2$ which decodes address signals traveling along the address bus ABUS to place predetermined ones of the FFs in a state where they can be set or reset, and which stores the data, traveling along the data bus DBUS, in predetermined FFs. In addition to the address bus ABUS and the data bus DBUS, a control signal bus CBUS is provided for exchanging the control signals. Cables $l_{11}$ through $l_{1n}$, and $l_{21}$ through $l_{2m}$ connect the data input/output unit 201$d$ with the machine side and carry the data exchanged between the data input/output unit 201$d$ and the machine tool.

The PSC 2 operates in the following manner. First, a table showing the correspondence between symbols and storage locations is prepared while referring to a ladder diagram. The symbols and storage locations are written in the ladder diagram as shown in FIG. 4, and the table shown in FIG. 6 is prepared. The table shows that the symbol AUT corresponds to the first bit at the address 10 of the data memory 201$a$, that the symbol M11 corresponds to the first bit at the address 67 of the data memory, and so on. Next, the sequence program is prepared. The sequence program is obtained by programming the functions shown in FIG. 1 logically in terms of operation codes and operands. For example, the ladder diagram shown in FIG. 4 is programmed as illustrated in FIG. 5. The operation codes in the sequence program are a read instruction RD, a logical multiplication operation instruction AND, a write instruction WRT, a logical addition operation instruction OR, and an instruction AND.NOT for logical multiplication with a negative value. MF, M28, ..., AUT, M03, ... denote operands which correspond to predetermined addresses and predetermined bits in the data memory 201a provided in the sequence controller 201. The logical operation $\overline{MF}.\overline{M28}.\overline{M24}.\overline{M22}.\overline{M21}.\overline{M18}.\overline{M14}.M12.M11$ is executed in accordance with the group of instructions (1) in the sequence program, the result of the operation (i.e., "1" or "0") being stored in the data memory 201a at a predetermined bit located at a predetermined address corresponding to the operand M03. The operation $AUT.M03.\overline{SPCCW}$ is executed in accordance with the group of instructions (2), the result being stored in the data memory 201a at a predetermined bit located at a predetermined address specified by the operand SPCCW.

The correspondence table and sequence program which have been prepared as described are then punched in a paper tape, and the paper tape is read by the paper tape reader 202b or 101a', the correspondence table thereby being stored in the table 202d, and the sequence program in the RAM 202c. When only the paper tape reader 101a' is employed, each paper tape is prepared in accordance with the standards for the NC 1, such as the standards determined by the EIA. Each of the paper tapes so prepared is then read by the tape reader 101a'. The correspondence table is delivered to the sending and receiving unit 101e through the bus line 101g in accordance with the control program of the NC 1, and is then stored in the table 202d of the programmer 202 through the sending and receiving units 201g and 201b of the sequence controller 201 and the sending receiving unit 202g of the programmer 202. The sequence program also is stored in similar fashion in the RAM 202c of the programmer 202. When the correspondence table and sequence program have been stored, the execution of the language processor program which has been stored in the ROM 202e starts, and each of the instructions in the sequence program is read out sequentially from the RAM 202c, and the operation codes nd operands are converted into machine language. The machine language into which the operands are converted represents the predetermined addresses and bits in the data memory 201a. The sequence program converted into machine language is transferred to and stored in the RAM 201c through the sending and receiving unit 202g in the programmer 202 and the sending and receiving unit 201b in the sequence controller 201.

Next, when the status of the changeover switches on the operation panel is set in the data memory 201a, the PSC 2 can begin to execute sequence processing. Hence, in accordance with the control program, the central processing unit CPU 201f executes sequence processing by reading out each instruction in the sequence program from the RAM 201c sequentially one instruction at a time from the initial instruction to the final instruction of the sequence program. When the processing of the final instruction has been completed, operation returns to the initial instruction of the sequence program, after which the processing of the sequence program instructions is repeated in a cyclic manner.

When the NC 1 issues a command such as the forward spindle rotation command M03 under these conditions, a "1" is stored in those bits of the data memory 201a that are to store the M-function and M-code signals M11, M12, that is, in the first bit of the address 66 and the first and second bits and so on of the address 67, as will be understood from FIG. 6.

Since the CPU 201f is executing sequence processing by cyclically repeating the read-out of the instructions in the sequence program as described above, a "1" is stored in the fifth bit located at the address 20 of the data memory 201a when the groups of instructions (1) and (2) (shown in FIG. 5) of the sequence program have been executed. Thereafter the contents (SPCW="1") of the fifth bit at the address 20 is stored in, say, the flip-flop $L_1$ of the data output circuit DO, shown in FIG. 7, and is delivered to the machine tool 3 through driver $D_1$ and cable $l_{21}$. This data signal closes the relay $R_1$ of the machine tool 3 to rotate the spindle in the forward direction. Then, when the spindle is rotating in the forward direction, a relay contact such as $RC_1$ closes, so that a signal indicative of completion of the forward rotation operation is stored in a predetermined bit of the data memory 201a through the cable $l_{11}$, receiver $R_1$, AND gate $G_1$ and data bus DBUS. As the processing of the sequence program continues, the fact that the forward rotation of the spindle has been completed is communicated to the NC 1 to end the sequence process step for the forward spindle rotation operation. The programmable sequence controller 2 processes not only the logical operations equivalent to the switches shown in FIGS. 1 and 4, but also executes processes equivalent to the functions of timers and counters or the like. A timer, for example, may function to close a predetermined relay upon the expiration of a certain time interval which has been set in the timer. A counter, on the other hand, is preset to a predetermined numerical value and may function to close a relay by delivering a "1" signal when the number of pulses entering the counter reaches the preset numerical value. These timer and counter functions are programmed into the sequence program. It should be noted that the hardware for presetting the timer and the counter is provided separately.

The PSC 2 which performs the sequence process steps as described above, is provided with a display function which displays the status of the data input signals (the outputs of the AND gates $G_1$ through $G_n$) applied to the data input/output unit, the data output signals (the set outputs of the flip-flops $L_1$ through $L_m$) and the status of the timer and counter functions, when the PSC 2 is performing the sequence process steps. Whereas the previously proposed PSC shown in FIG. 2 employs the display device 201j, the present invention makes use of the display device 101i provided in the NC 1 in order to reduce costs. A display device changeover switch, which is provided on the operation panel of the NC 1, is set to a flip-flop, counter or timer position to permit the content so selected to be sent through the sending and receiving units 201g, 101e to the register of the display device 101i where the data is displayed.

The PSC 2 is further provided with a function which allows preset numerical values or the like to be set in such hardware as the counters and registers in the data input/output unit 201d. The previously proposed PSC employs the data setting device 201i which is provided exclusively for this purpose, whereas in accordance with the present invention, the hardware is set under the control of the control program by using the manual data input unit MDI 101h of the NC 1 which acts through the sending and receiving units 101e, 201i. More specifically, the display device 101i and the manual data input unit MDI 101h in the arrangement of FIG. 3 are employed by both the NC 1 and the sequence controller 201, so that the display device and data setting device can be deleted from the sequence controller 201.

In accordance with the present invention as described above, the display and data setting units are employed by both the NC and the sequence controller. In other words, the sequence controller 201 is capable of utilizing the manual data input unit MDI 101h and the display device 101i which are provided in the NC 1, so that these devices need not be provided separately for the sequence controller. This lowers the cost of the system and reduces its size.

Although the present invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A programmable sequence controller, operatively connected to a numerical control device which is for generating commands, said numerical control device including display means for displaying input and output signals and manual data input means for inputting numerical values, and said programmable sequence controller operatively connected to a machine which generates input signals, such as a machine tool or robot, wherein said programmable sequence controller comprises a data input/output unit operatively connected to the machine and the numerical control device, and said programmable sequence controller for executing sequence process steps in dependence upon a predetermined internal sequence program and for generating and transmitting the output signals, in dependence upon the commands from the numerical control device, to the machine through said data input/output unit, said data input/output unit including:
   flip-flops, operatively connected between the machine and the numerical control device, for storing the input and output signals;
   counters, operatively connected between the machine and the numerical control device, for storing the input and output signals; and
   registers, operatively connected between the machine and the numerical control device, for storing the input and output signals;
   wherein the contents of the flip-flops, counters, and registers in said data input/output unit, which are for temporarily storing the input and output signals sent to and received from the machine, are displayed on the display means in the numerical control device, and wherein predetermined numerical values are set in said counters and registers by the manual data input means in the numerical control device.

2. A programmable sequence controller according to claim 1,
   wherein the numerical control device further includes a first sending and receiving unit operatively connected to the display means,
   wherein said programmable sequence controller further comprises a second sending and receiving unit operatively connected to said data input/output unit and operatively connected to the first sending and receiving unit, and
   wherein the contents of the flip-flops, counters and registers in said data input/output unit are transmitted to the display means in the numerical control device through said first and said second sending and receiving units which are respectively provided in both the numerical control device and said programmable sequence controller, whereby the numerical control device and programmable sequence controller exchange such data as commands.

3. A programmable sequence controller according to claim 1,
   wherein the numerical control device further includes a first sending and receiving unit operatively connected to said manual data input means,
   wherein said programmable sequence controller further comprises a second sending and receiving unit operatively connected to said data input/output unit and operatively connected to the first sending and receiving unit, and
   wherein numerical values input by said manual data input means are transmitted to said data input/output unit through said first and said second sending and receiving units which are respectively provided in both the numerical control device and said programmable sequence controller, whereby the numerical control device and programmable sequence controller exchange such data as commands.

4. A programmable sequence controller operatively connected between a numerical control device and a machine tool, wherein said numerical control device generates commands and includes:
   display means for displaying input and output signals and predetermined numerical values; and
   manual data input means, operatively connected to said display means, for inputting the predetermined numerical values,
   said machine tool generating input signals,
   said programmable sequence controller executing sequence process steps in dependence upon a predetermined internal sequence program and comprising:
   a data input/output unit, operatively connected to the machine tool, the numerical control device, the display means and the manual data input means, for generating output signals in dependence upon the commands output by said numerical control device, and for storing the input and the output signals and for transmitting the output signals to the machine tool, said data input/output unit comprising:
   a data input circuit operatively connectable between the machine tool and the numerical control device, including:
   a first decoder operatively connected to the numerical control device;
   AND gates operatively connected to said decoder and operatively connectable to the numerical control device; and
   receivers each operatively connected to one of said AND gates and each operatively connectable to the machine tool; and a data output circuit, operatively connectable between the machine tool and the numerical control device, including:

a second decoder operatively connectable to the numerical control device;

output flip-flops operatively connectable to the numerical control device and operatively connected to said second decoder; and drivers each operatively connected to one of said output flip-flops and each operatively connectable to the machine tool, the input and output signals being selectively displayed on said display means and the predetermined numerical values being selectively stored in said data input/output unit and displayed on said display means.

* * * * *

UNITED STATES PATENT AND TRADEMARK OFFICE
CERTIFICATE OF CORRECTION

PATENT NO. : 4,415,965
DATED : November 15, 1983
INVENTOR(S) : Imazeki et al.

It is certified that error appears in the above-identified patent and that said Letters Patent is hereby corrected as shown below:

```
Front page, [57] ABSTRACT, line 8, "content" should be
                --contents--.

Col. 5, line 5, "AND.NOT" should be --AND·NOT--;
        line 10, [spacing]
        line 11, "." [all occurrences] should be --·--;
        line 43, delete "and".
```

Signed and Sealed this

Third Day of April 1984

[SEAL]

Attest:

GERALD J. MOSSINGHOFF

Attesting Officer  Commissioner of Patents and Trademarks